United States Patent
Kunimitsu et al.

(10) Patent No.: US 10,048,894 B2
(45) Date of Patent: Aug. 14, 2018

(54) REDUCING CACHE MEMORY REQUIREMENTS FOR RECORDING STATISTICS FROM TESTING WITH A MULTIPLICITY OF FLOWS

(71) Applicant: Spirent Communications, Inc., Sunnyvale, CA (US)

(72) Inventors: Jocelyn Kunimitsu, Aiea, HI (US); Craig Fujikami, Honolulu, HI (US)

(73) Assignee: Spirent Communications, Inc., Sunnyvale, CA (US)

( * ) Notice: Subject to any disclaimer, the term of this patent is extended or adjusted under 35 U.S.C. 154(b) by 161 days.

(21) Appl. No.: 15/208,520

(22) Filed: Jul. 12, 2016

(65) Prior Publication Data

US 2018/0018130 A1    Jan. 18, 2018

(51) Int. Cl.
*G06F 3/06* (2006.01)
*G06F 12/0802* (2016.01)

(52) U.S. Cl.
CPC .......... *G06F 3/0656* (2013.01); *G06F 3/0604* (2013.01); *G06F 3/067* (2013.01); *G06F 3/0622* (2013.01); *G06F 12/0802* (2013.01); *G06F 2212/60* (2013.01)

(58) Field of Classification Search
CPC .... G06F 3/0604; G06F 3/0622; G06F 3/0656; G06F 3/067; G06F 12/0802; G06F 17/30312; G06F 2212/60
USPC ........................................................ 709/224
See application file for complete search history.

(56) References Cited

U.S. PATENT DOCUMENTS

| | | | |
|---|---|---|---|
| 5,121,498 A * | 6/1992 | Gilbert | G06F 8/452 717/141 |
| 7,454,555 B2 | 11/2008 | Ware et al. | |
| 7,680,097 B1 * | 3/2010 | Goldstein | H04L 49/101 370/351 |
| 9,325,601 B2 | 4/2016 | Fujikami et al. | |
| 2002/0147883 A1 | 10/2002 | Hsu et al. | |
| 2005/0138622 A1* | 6/2005 | McAlpine | G06F 9/3851 718/100 |
| 2008/0282034 A1* | 11/2008 | Jiao | G06F 9/30025 711/125 |
| 2010/0332718 A1 | 12/2010 | Farrell et al. | |

(Continued)

OTHER PUBLICATIONS

XILINX, Inc., "7 Series Memory Resources" Parts 1 and 2; 2012, pp. 1-32.

(Continued)

*Primary Examiner* — Ruolei Zong
(74) *Attorney, Agent, or Firm* — Haynes Beffel & Wolfeld LLP; Ernest J. Beffel, Jr.; Andrew L. Dunlap

(57) ABSTRACT

A disclosed method processes a data feed including multiple streams. The method includes processing n frames of the multiple streams in parallel through n processing pipelines, n being an integer greater than or equal to 2. The n frames include a first frame belonging to a first stream and a second frame belonging to a second stream. The first stream is different than the second stream. The n processing pipelines are coupled to n-by-n value buffers per stream per recorded value for the stream, and at least one status buffer per stream. The n processing pipelines are each assigned a distinct row of read-authorized port access to the n-by-n value buffers and a distinct column of write-authorized port access to the n-by-n value buffers.

33 Claims, 16 Drawing Sheets

(56) References Cited

U.S. PATENT DOCUMENTS

| | | | |
|---|---|---|---|
| 2012/0109849 A1* | 5/2012 | Chamberlain | G06F 3/061 |
| | | | 705/36 R |
| 2013/0039135 A1 | 2/2013 | Kang et al. | |
| 2014/0201458 A1* | 7/2014 | Fujikami | H04L 43/026 |
| | | | 711/136 |
| 2015/0234871 A1* | 8/2015 | Viehland | G06F 17/30315 |
| | | | 707/756 |

OTHER PUBLICATIONS

XILINX, Inc. "7 Series FPGAs Memory Resources User Guide" Nov. 12, 2014, pp. 1-86.

* cited by examiner

REDUCING CACHE MEMORY REQUIREMENTS FOR RECORDING STATISTICS FROM TESTING WITH A MULTIPLICITY OF FLOWS

BACKGROUND

The subject matter discussed the background section should not be assumed to be prior art merely as a result of its mention in the background section. Similarly, a problem mentioned in the background section or associated with the subject matter of the background section should not be assumed to have been previously recognized in the prior art. The subject matter in the background section merely represents different approaches, which in and of themselves may also correspond to implementations of the claimed inventions.

The technology disclosed relates to testing internet traffic flows. In particular, it relates to reducing clock speed requirements for memory that stores statistics from testing with a data feed containing a multiplicity of streams.

When testing network traffic and network equipment, statistics about each of the streams, such as frame and byte counts, are counted and stored in memory. Smaller and faster cache memory or register memory may be suitable to keep track of the counters at high bandwidth rates. However, at 400 gigabit Ethernet (400 GbE), Terabit Ethernet (1 TbE), or higher data rates, thousands of streams may be tracked and analyzed, such that the volume of statistics render cache memory or register memory unsuitable, and RAMs suitable.

Although RAMs are suitable from the aspect of data volume, RAMs are not ideal from the aspect of speed. To update a statistic in a RAM, the data must be read from the RAM, modified, and then written back into the RAM. The maximum update rate is determined by the RAM read and write access times and the time to modify the data. In a simple RAM update, the maximum update rate is 1/(RAM read access time+time to modify the data+RAM write access time).

Tracking stream-based counters is straightforward when the maximum update time of RAM is fast enough to keep pace with the maximum frame rate. However, tracking stream-based counters is difficult when the maximum update time of RAM is too slow. Moreover, tracking stream-based counters is especially demanding because such statistics require the processing to be done in strict frame order.

At 400GbE data rates, the maximum frame rate is 400GbE/(8 bits*(12 byte inter-frame gap+8 byte preamble+ 64 byte frame)), which is over 595 million frames per second. Finding RAMs that can support reading-modifying-writing a counter at 595 million frames a second is quite difficult, especially if strict ordering is required. For example on the latest Xilinx FPGAs, True Dual Port Block RAMs have a maximum frequency of 525 Mhz and 585 MHz at the lower speed grades. Although the costliest and fastest FPGAs are claimed to run at 660 MHz, such FPGAs require pipeline delays on the read path at such speeds, thus requiring extra processing to handle ordering, as well as the update and write back to the other port of the dual port RAM. Circuitry running at such speeds will have difficulties to meet timing requirements, and limit the complexity of the types of statistics that can be supported.

An opportunity arises to provide a method and apparatus to process frames for stream statistics quickly enough with RAMs that have a maximum update time that is too slow to keep pace with the maximum frame rate of a data feed.

SUMMARY

One implementation of the technology disclosed describes a method that reduces cache memory requirements for testing a multiplicity of streams. The method includes receiving data corresponding to a frame in a particular stream among the multiplicity of streams. In response to the frame received, the method updates a set of cached flow counters in cache memory for the particular stream. The method updates one or more regular operation counters and one or more conditional counters among the set of cached flow counters. The method updates, responsive to any error conditions detected, one or more error condition counters among the set of cached flow counters. Responsive to the evaluating, the method transfers the values from the cached flow counters to the system accumulators.

Particular aspects of the technology disclosed are described in the claims, specification and drawings.

BRIEF DESCRIPTION OF THE DRAWINGS

The included drawings are for illustrative purposes and serve only to provide examples of possible structures and process operations for one or more implementations of this disclosure. These drawings in no way limit any changes in form and detail that may be made by one skilled in the art without departing from the spirit and scope of this disclosure. A more complete understanding of the subject matter may be derived by referring to the detailed description and claims when considered in conjunction with the following figures, wherein like reference numbers refer to similar elements throughout the figures.

DETAILED DESCRIPTION

The following detailed description is made with reference to the figures. Examples are described to illustrate the technology disclosed, not to limit its scope, which is defined by the claims. Those of ordinary skill in the art will recognize a variety of equivalent variations on the description that follows.

In a test system that generates a multiplicity of network traffic streams, on the order of thousands or millions of simultaneous streams, RAM is used to count statistics for each stream at high rates compatible with the high data rates. The system needs to track and analyze thousands or millions of streams simultaneously and accurately. Applicants have discovered that the clock speed requirements of the RAM are driven unnecessarily by processing the frames in a single queue. By using a more efficient approach of generating statistics from multiple frames in parallel as disclosed in this application, the clock speed requirements of the RAM in the system can be reduced by processing multiple frames in parallel.

Figure 1:
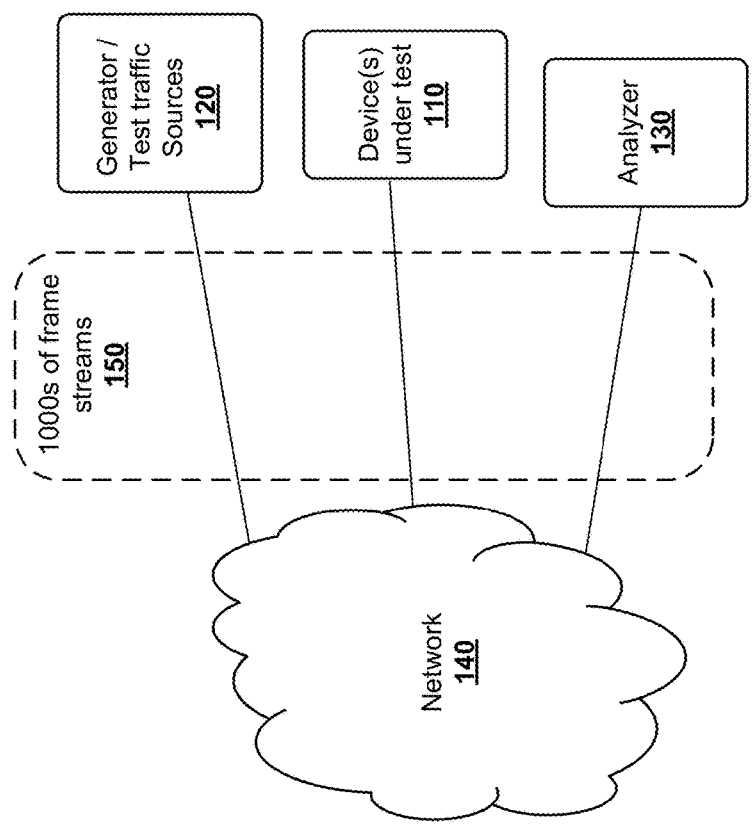
FIG. 1 illustrates a block diagram of an example test network in which thousands of frame streams are sent by a generator and received by an analyzer, for testing network equipment and recording statistics from testing with a multiplicity of flows.

FIG. 1 illustrates a block diagram of an example test network in which thousands of frame streams 150 are sent by a generator 120 and received by an analyzer 130, for testing network equipment such as device(s) under test 110 and recording statistics from testing with a multiplicity of flows. Examples of generator 120 and analyzer 130 are shown in FIGS. 2 and 3 respectively.

Figure 2:
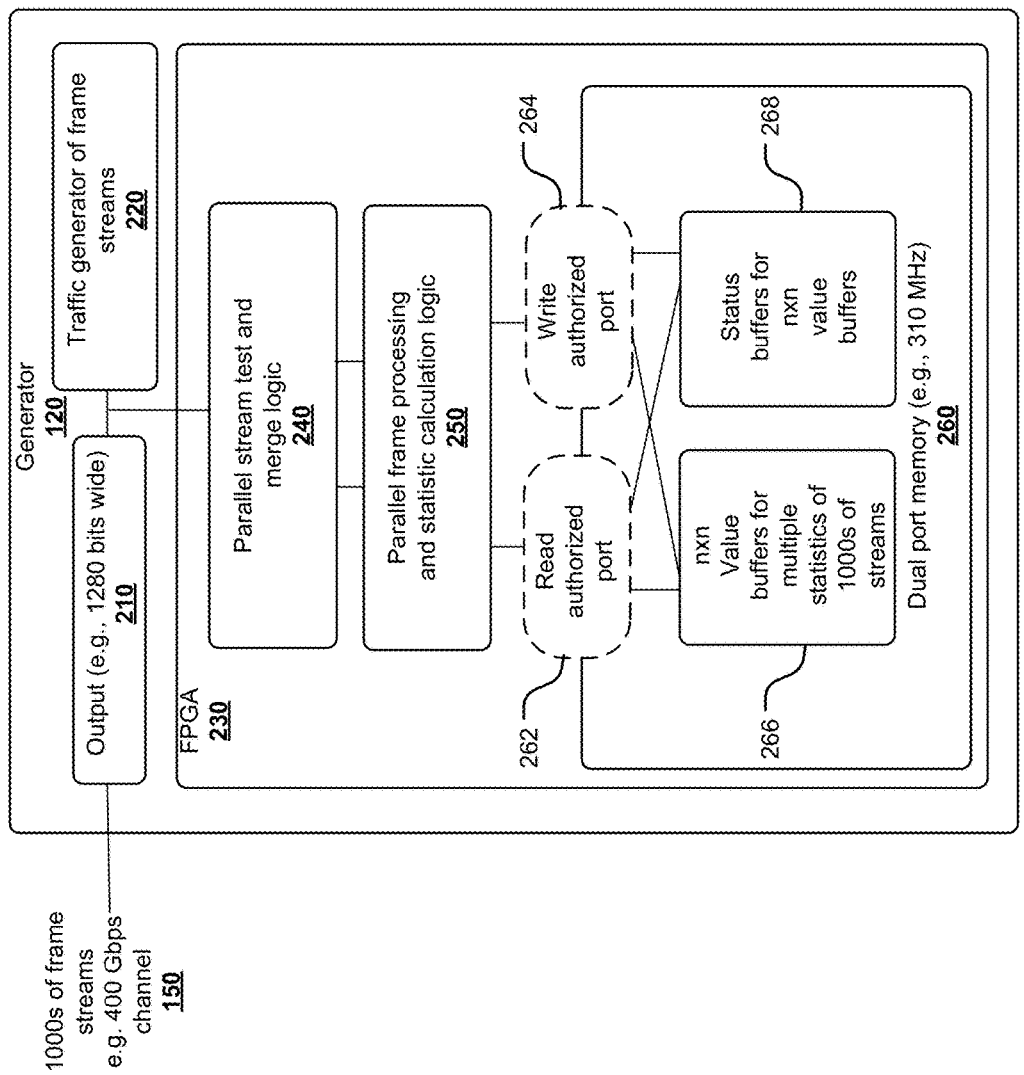
FIG. 2 illustrates a block diagram of an example generator in the example test network that generates test traffic and generates statistics about the test traffic.
Figure 3:
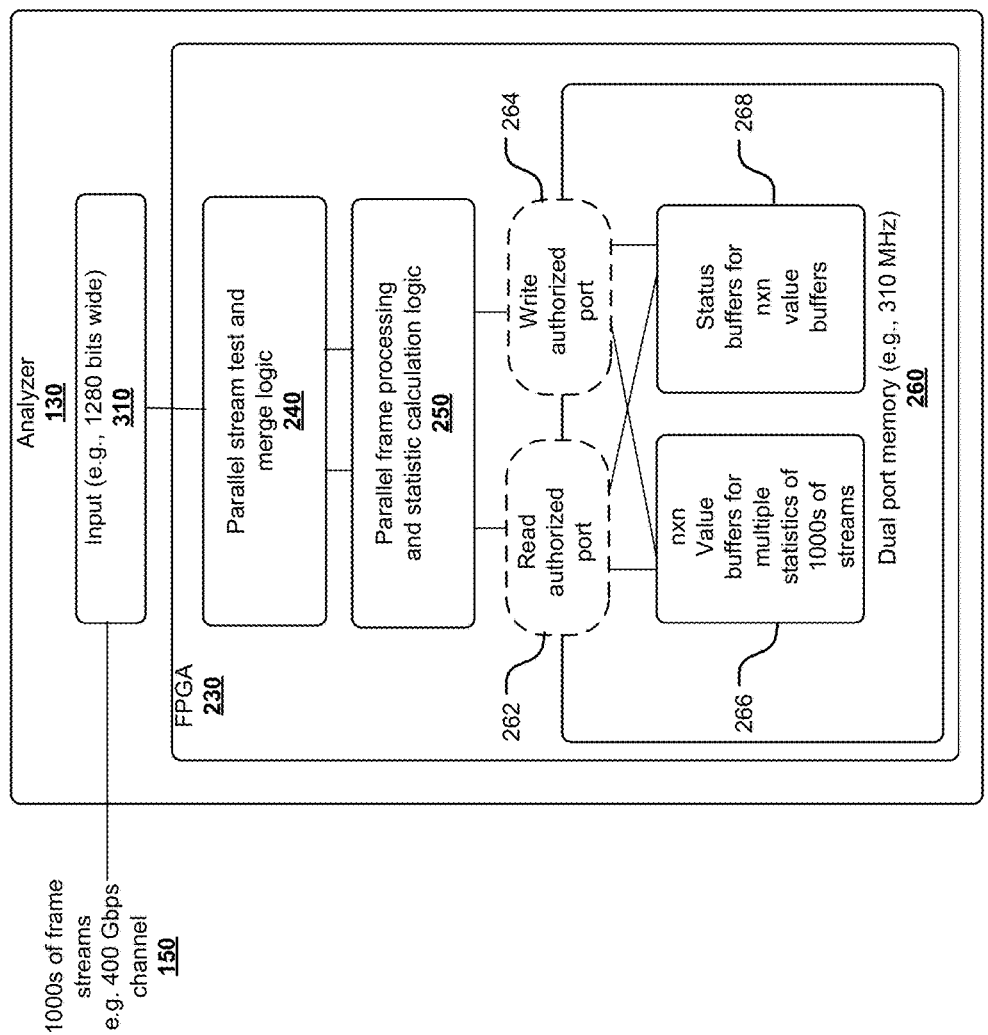
FIG. 3 illustrates a block diagram of an example analyzer in the example test network that receives test traffic and generates statistics about the test traffic.

FIG. 2 illustrates a block diagram of an example generator 120 in the example test network that generates test traffic and generates statistics about the test traffic. Traffic generator 220 generates streams of frames in order to test network equipment. The generated traffic of 1000s of frame streams 150 is sent via an output 210 that is, for example, 1280 bits wide, to a high speed channel such as a 400 Gbps Ethernet channel. The embodiments discussed herein are applicable to higher speeds and future standards, such as Terabit Ethernet. The embodiments discussed herein are applicable also to reduce RAM clock speed requirements associated with traffic data feeds of slower speeds and standards, such as Gigabit Ethernet, 10 Gigabit Ethernet, 40 Gigabit Ethernet, and 100 Gigabit Ethernet.

The traffic generated by traffic generator 220 is received also by FPGA 230. Although in this figure a single line connects figure elements such as traffic generator 220 and 240, the single line represents a single serial stream in some embodiments and represents multiple parallel streams in other embodiments.

Parallel stream test and merge logic 240 tests whether different frames in multiple parallel processing pipelines belong to the same stream or to different streams. If different frames belong to the same stream, then the different frames are merged into a single frame. If different frames belong to different streams, then the different frames remain discrete. Examples of the operation of parallel test and merge logic 240 are shown in FIGS. 13-16.

Parallel frame processing and statistic calculation logic 250 processes multiple frames in parallel to read statistics for the streams to which the frames belong, calculate new statistics for these, and write new statistics for these streams. Parallel frame processing and statistic calculation logic 250 reads statistics for the streams to which the frames belong via read authorized port 262 of dual port memory 260. Parallel frame processing and statistic calculation logic 250 writes new statistics for the streams to which the frames belong via write authorized port 264 of dual port memory 260.

Dual port memory 260 is clocked at 310 MHz in one embodiment, which can support a frame throughput=clock rate*number of parallel pipelines. For example, a frame throughput for 2 parallel pipelines 310 MHz*2=620 million frames per second, and a frame throughput for 3 parallel pipelines 310 MHz*3=930 million frames per second. In such examples the combined throughput of the n parallel pipelines, where n is an integer greater than or equal to 2, is at least 2 frames per clock cycle. Such embodiments are able to handle the required throughput of over 595 million frames per second associated with 400 GbE data rates. Other embodiments use RAM with an increased clock rate to handle higher throughputs, or a decreased clock rate to handle slower throughputs. Other embodiments increase the number of parallel pipelines to 4 or more to handle higher throughputs. Other embodiments combine both a different clock rate and a different number of parallel pipelines.

Dual port memory 260 has n×n value buffers 266 storing multiple statistics of thousands of streams and status buffers 268 for n×n value buffers. Examples of parallel processing of the frames, and memory access to read statistics from the dual port memory 260 and write updated statistics to the dual port memory 260 are shown in FIGS. 4-12. Dual port memory 260 accesses any of the n×n value buffers 266 via both the read authorized port 262 and write authorized port 264 at the same time. In one example, the n×n buffers are cached such that the cached contents of an n×n buffer are read simultaneously with writing updated contents to the n×n buffer. In another example, a memory is accessed in a read-before-write mode, such that data previously stored at the write address appears on the output, while the input data is being written to the memory.

FIG. 3 illustrates a block diagram of an example analyzer 130 in the example test network that receives test traffic and generates statistics about the test traffic.

Traffic of 1000s of frame streams 150 is received via an input 310 that is, for example, 1280 bits wide, from a high speed channel such as a 400 Gbps Ethernet channel. The embodiments discussed herein are applicable to higher speeds and future standards, such as Terabit Ethernet. The embodiments discussed herein are applicable also to reduce RAM clock speed requirements associated with traffic data feeds of slower speeds and standards, such as Gigabit Ethernet, 10 Gigabit Ethernet, 40 Gigabit Ethernet, and 100 Gigabit Ethernet. The traffic is received then by FPGA 230. Although in this figure a single line connects figure elements such as traffic generator 220 and 240, the single line represents a single serial stream in some embodiments and represents multiple parallel streams in other embodiments. The FPGA 230 is discussed in connection with FIG. 2.

Figure 4:
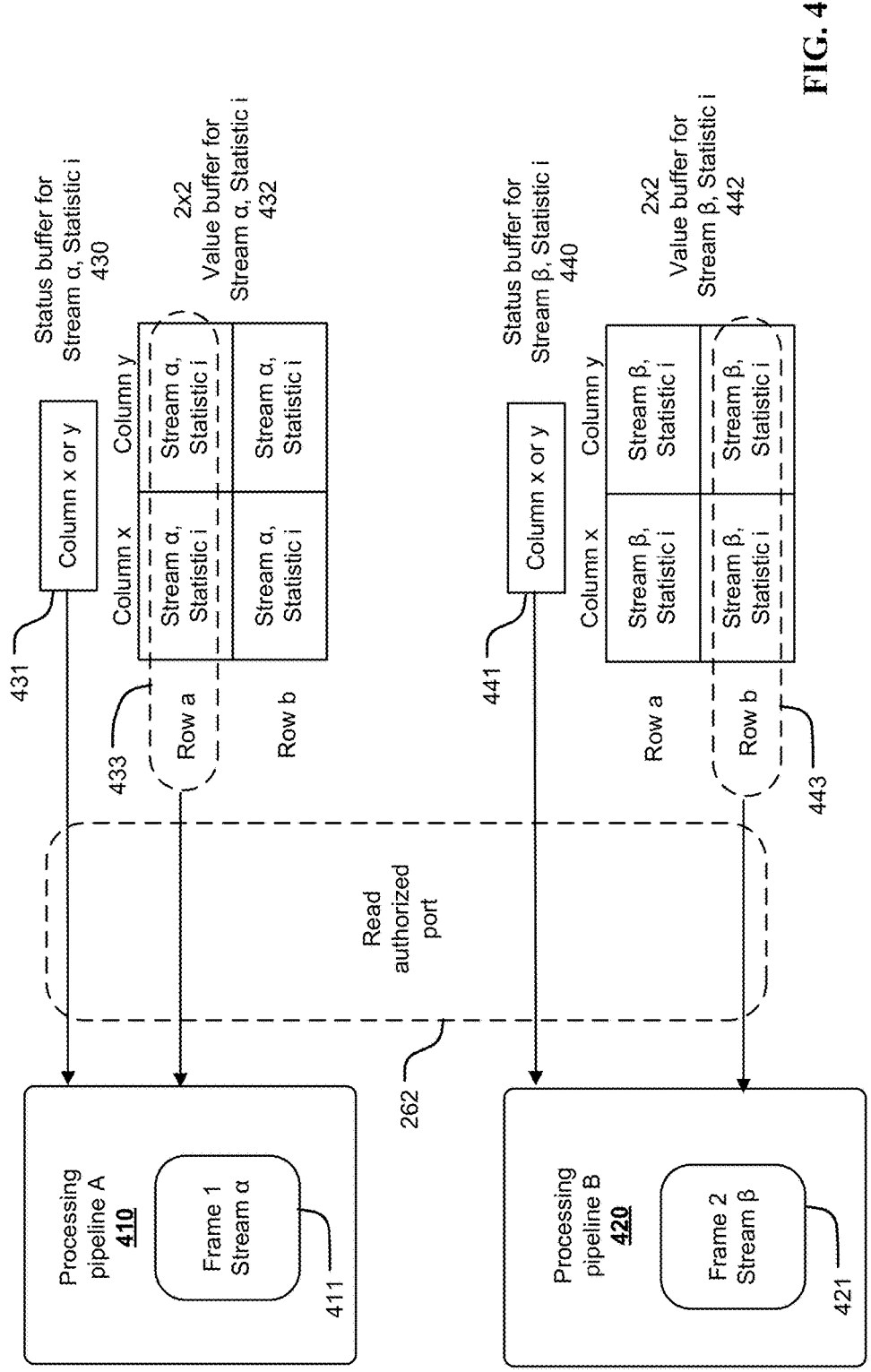
FIG. 4 illustrates 2 parallel processing pipelines that read rows of statistics from 2×2 buffers for 2 streams in parallel.

FIG. 4 illustrates 2 parallel processing pipelines that read rows of statistics from 2×2 buffers for 2 streams in parallel.

Parallel pipeline A 410 processes frame 1 411 of stream α. Processing pipeline A 410 reads statistics from 2×2 value buffer 432 for stream α, statistic i via read authorized port 262. The 2×2 value buffer 432 is shown as a 2×2 array with Columns x and y and Rows a and b. Processing pipeline A 410 also reads data from status buffer 430 for stream α, statistic i via read authorized port 262.

Rows and arrays of a value buffer in one embodiment are a conceptualization of memory. Each row identifies a first particular set of multiple memory locations of multiple instances of a statistic i for stream α, each column identifies a second particular set of multiple memory locations of multiple instances of a statistic i for stream α, and each intersection of a particular row and a particular column identifies a single memory location of an instance of a statistic i for stream α. It is optional for the columns and rows of a value buffer to correspond with physical columns and physical rows of a physical memory array. In various embodiments, a row of the value buffer is located in a single physical memory device, or located across multiple physical memory devices. In various embodiments, a column of the value buffer is located in a single physical memory device, or located across multiple physical memory devices. In various embodiments, the status buffer is located in a physical memory device that is the same for at least part of the value buffer, or in a different one. Where rows are replaced with columns, and columns are replaced with rows, the result is another embodiment, as rows and columns are identifiers of different particular sets of multiple memory locations of multiple instances of a statistic i for stream α, and in the result such identifiers have been exchanged.

In one embodiment, the physical memories of the value buffers are internal to a same FPGA and operate off of a same clock. In one embodiment, at least one of the physical memories is external to the FPGA and operates off of a clock different than the FPGA memories.

Processing pipeline A 410 reads a portion of the statistics from 2×2 value buffer 432 for stream α, statistic i, in particular Row a 433 spanning Columns x and y. Although Columns x and y both store statistics, one of Columns x and y stores most recently updated statistics i for stream α, and the other of Columns x and y stores older statistics i for stream α. Processing pipeline A 410 also reads data from the status buffer 430 for stream α, statistic i via read authorized port 262, where the data indicates Column x or y 431. The Column x or y data 431 from the status buffer 430 identifies one of Columns x and y as storing the most recently updated statistics i for stream α.

Processing pipeline B 420, which operates in parallel with pipeline A 410, processes frame 2 421 of stream β. Processing pipeline B 420 reads statistics from 2×2 value buffer 442 for stream β, statistic i via read authorized port 262. The 2×2 value buffer 442 is shown as a 2×2 array with Columns x and y and Rows a and b. Processing pipeline B 420 also reads Column x or y data 441 from status buffer 440 for stream β, statistic i via read authorized port 262. The Column x or y data 441 from the status buffer 440 identifies one of Columns x and y as storing the most recently updated statistics i for stream β. The processing by parallel pipeline B 420 of frame 2 421 of stream β is similar to the processing by parallel pipeline A 410 of frame 1 411 of stream α. Thus, parallel pipeline A 410 and parallel pipeline B 420 process in parallel different frames of different streams.

Figure 5:
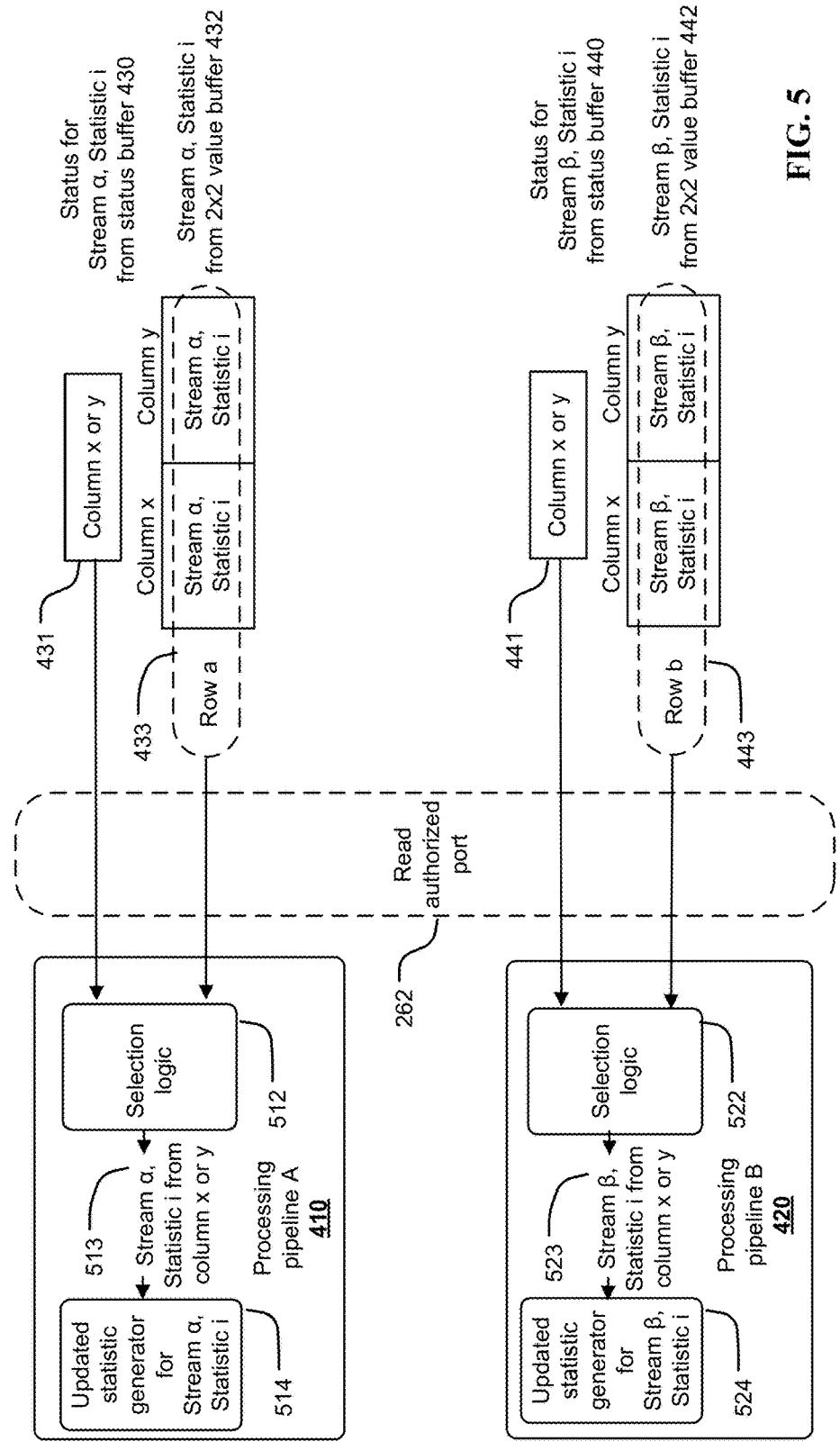
FIG. 5 illustrates 2 parallel processing pipelines that select most recently updated statistics out of rows of statistics that were read from 2×2 buffers.

FIG. 5 illustrates 2 parallel processing pipelines that select most recently updated statistics out of rows of statistics that were read from 2×2 buffers.

As shown in FIG. 4, processing pipeline A 410 read Row a 433 spanning Columns x and y from 2×2 value buffer 432 via read authorized port 262, and processing pipeline A 410 also read the status 431 from the status buffer 430 for stream α, statistic i via read authorized port 262, where the status 431 indicates Column x or y. Selection logic 512 uses the status 431 to select the most recently updated statistic i for stream α, which could be in Column x or y of Row a 433. This most recently updated statistic i for stream α 513 is shown as the output of selection logic 512. The updated statistic generator 514, in dependence on frame 1 411 of stream α, generates an updated version of the most recently updated statistic i for stream α 513.

Another embodiment uses status 431 from the status buffer 430 to selectively read the most recently updated statistic out of Row a 433, for example selectively reading Column x or y of Row a 433. Such an approach does not require selection logic 512 to select the most recently updated statistic, unlike the shown embodiment which indiscriminately reads Row a 433 spanning Columns x and y and then uses selection logic 512 to select the most recently updated statistic. However, the shown embodiment is faster. Selection logic 512 operates faster than the selective read approach, due to elimination of latency from waiting to read in Row a 433 until initially reading status 431 from status buffer 430.

Examples of the different statistics that are updated by an updated statistics generator are as follows. For each stream of the multiplicity of streams, one or more of the following statistics are tracked as discussed in the application. In another embodiment, at least one of the streams is ignored and one or more of the following statistics are tracked for only a subset of the multiplicity of streams. N(sequence no) is the sequence number in a particular stream for the last frame which was processed and incorporated into most recently updated statistics for the particular stream. M(sequence no) is the sequence number in the same particular stream for the next frame, immediately subsequent to the last frame, which is being processed to update statistics for the particular stream. Out of the following statistics, statistics that rely on a sequence number are examples of order-based statistics.

Rx (receive) Frame Count
Rx Byte Count
Simple In/Out of sequence checking
   Last Sequence Number, also known as N(sequence no)
   In Sequence Count
     When M(sequence no) N(sequence no)+1
   Out of Sequence Frame Count
     When M(sequence no)==N(sequence no)+1
Minimum Latency
   Latency is the time difference from frame is transmitted to received
Maximum Latency
Accumulated Latency (used to calculate average latency)
Minimum Inter-arrival Time
   Inter-arrival time is the time between received frames
Maximum Inter-arrival Time time)
Minimum Jitter
   Jitter is the time difference between received latencies
Maximum Jitter
PRBS fill Bytes
   Total number of PRBS bytes in received frames
PRBS Bit Errors PRBS Errored Frame Count
  Number of frames with any PRBS errors in it
IPv4 Checksum Error Count
TCP Checksum Error Count
UDP Checksum Error Count
FCS-32 Error Count
Minimum Frame Length
Maximum Frame Length As shown in FIG. 4, processing pipeline B 420 reads Row b 443 spanning Columns x and y from 2×2 value buffer 442 via read authorized port 262, and processing pipeline B 420 also reads the status 441 from the status buffer 440 for stream β, statistic i via read authorized port 262, where the status 441 indicates Column x or y. Selection logic 522 uses the status 441 to select the most recently updated statistic i for stream β, which could be in Column x or y of Row b 443. This most recently updated statistic i for stream β 523 is shown as the output of selection logic 522. The updated statistic generator 524, in dependence on frame 2 421 of stream β, generates an updated version of the most recently updated statistic i for stream β 523.

Figure 6:
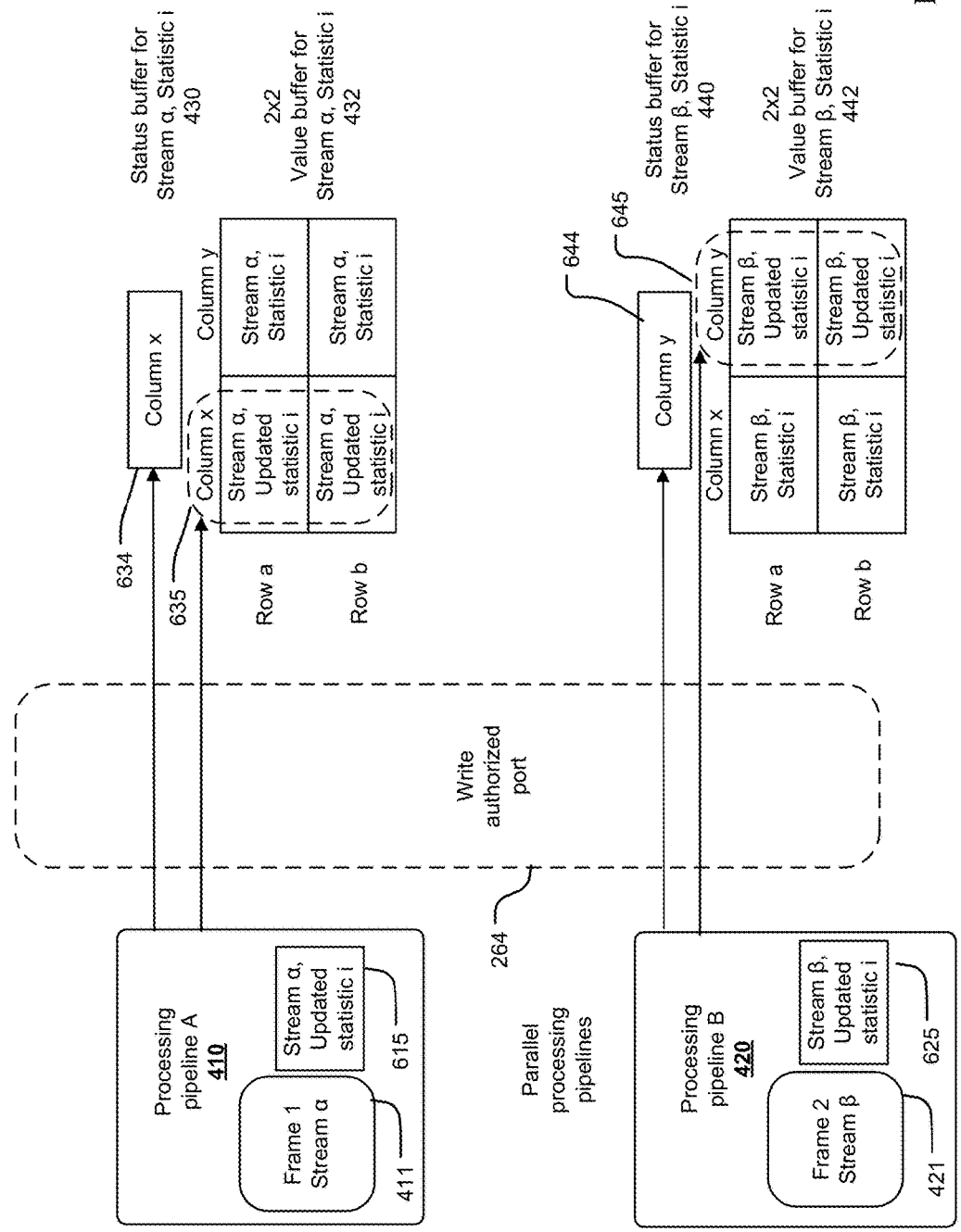
FIG. 6 illustrates 2 parallel processing pipelines that write columns of updated statistics to 2×2 buffers for 2 streams in parallel.

FIG. 6 illustrates 2 parallel processing pipelines that write columns of updated statistics to 2×2 buffers for 2 streams in parallel.

In processing pipeline A 410, updated statistic i 615 for stream α was generated by updated statistic generator 514 of FIG. 5. Processing pipeline A 410 writes updated statistic i 615 into a portion of 2×2 value buffer 432 for stream α, statistic i, in particular Column x 635 spanning Rows a and b. The same statistic i is mirrored across Rows a and b of Column x 635, such that in a subsequent read from 2×2 value buffer 432, reading either Row a or b of Column x 635 will access the most recently updated statistic i of stream α stored in 2×2 value buffer 432.

Processing pipeline A 410 also writes a value identifying Column x 634 into the status buffer 430. Then, in a future read from the 2×2 value buffer 432 for stream α, statistic i of Row a or b spanning Columns x and y, the following is performed. The particular processing pipeline, which is performing the future read from the 2×2 value buffer 432, also reads from the status buffer 430 and relies on the value identifying Column x 634 to select Column x of Row a or b as the most recently updated statistic i for stream α.

In processing pipeline B 420, updated statistic i 625 for stream β was generated by updated statistic generator 524 of FIG. 5. Processing pipeline B 420 writes updated statistic i 625 into a portion of 2×2 value buffer 442 for stream β, statistic i, in particular Column y 645 spanning Rows a and b. Processing pipeline B 420 also writes a value identifying Column y 644 into the status buffer 440. Then, in a future read from the 2×2 value buffer 442 for stream β, statistic i, of Row a or b each spanning Columns x and y, the following is performed. The particular processing pipeline, which is performing the future read from the 2×2 value buffer 442, also reads from the status buffer 440 and relies on the value identifying Column y 644 read from the status buffer 440 to select Column y of Row a or b as the most recently updated statistic i for stream β.

In the examples of FIGS. 4-6, the statistic i is the same type of statistic for stream α of frame 1 411 of processing pipeline A 410, and stream β of Frame 2 421 of processing pipeline B 420. In other examples, different statistic types i and j are read for stream α of frame 1 411 of processing pipeline A 410, and stream β of Frame 2 421 of processing pipeline B 420.

Figure 7:
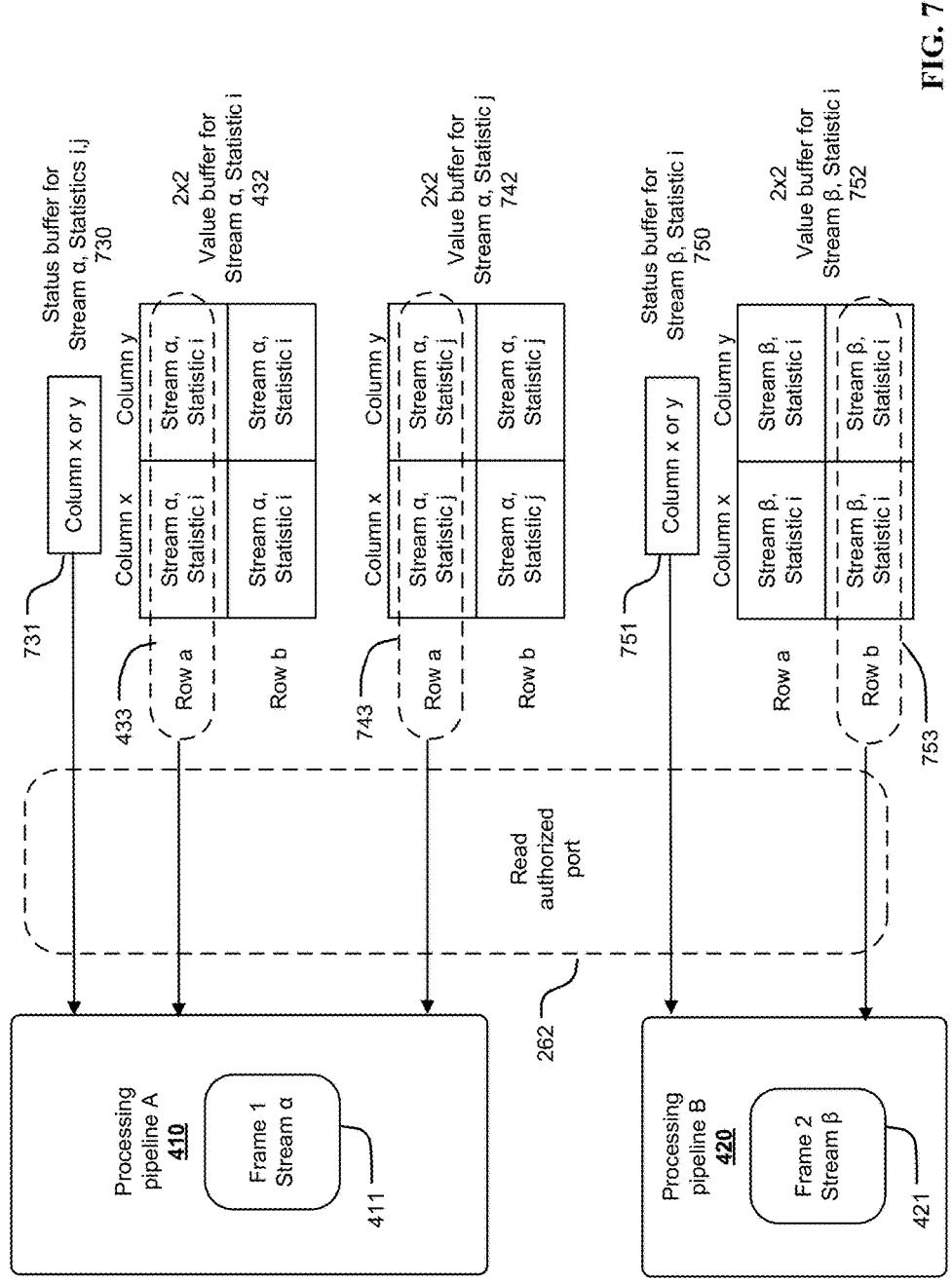
FIG. 7 illustrates 2 parallel processing pipelines that read rows of statistics from 2×2 buffers for 2 streams in parallel, including multiple statistics for a same stream.

FIG. 7 illustrates 2 parallel processing pipelines that read rows of statistics from 2×2 buffers for 2 streams in parallel, including multiple statistics for a same stream. In addition to the elements in FIG. 4, in FIG. 7 parallel pipeline A 410 reads statistics from 2×2 value buffer 742 for stream α, statistic j via read authorized port 262. The 2×2 value buffer 742 is shown as a 2×2 array with Columns x and y and Rows a and b. In particular, processing pipeline A 410 reads the statistics in Row a 743 spanning Columns x and y from 2×2 value buffer 742 for stream a, statistic j. Although Columns x and y both store statistics, one of Columns x and y stores most recently updated statistics j for stream α, and the other of Columns x and y stores older statistics j for stream α.

In FIG. 7, processing pipeline A 410 reads data from the status buffer 730 for stream α, statistics i,j via read authorized port 262, where the data indicates Column x or y 731. The Column x or y data 731 from the status buffer 730 identifies one of Columns x and y as storing the most recently updated statistics i and j for stream α.

Figure 8:
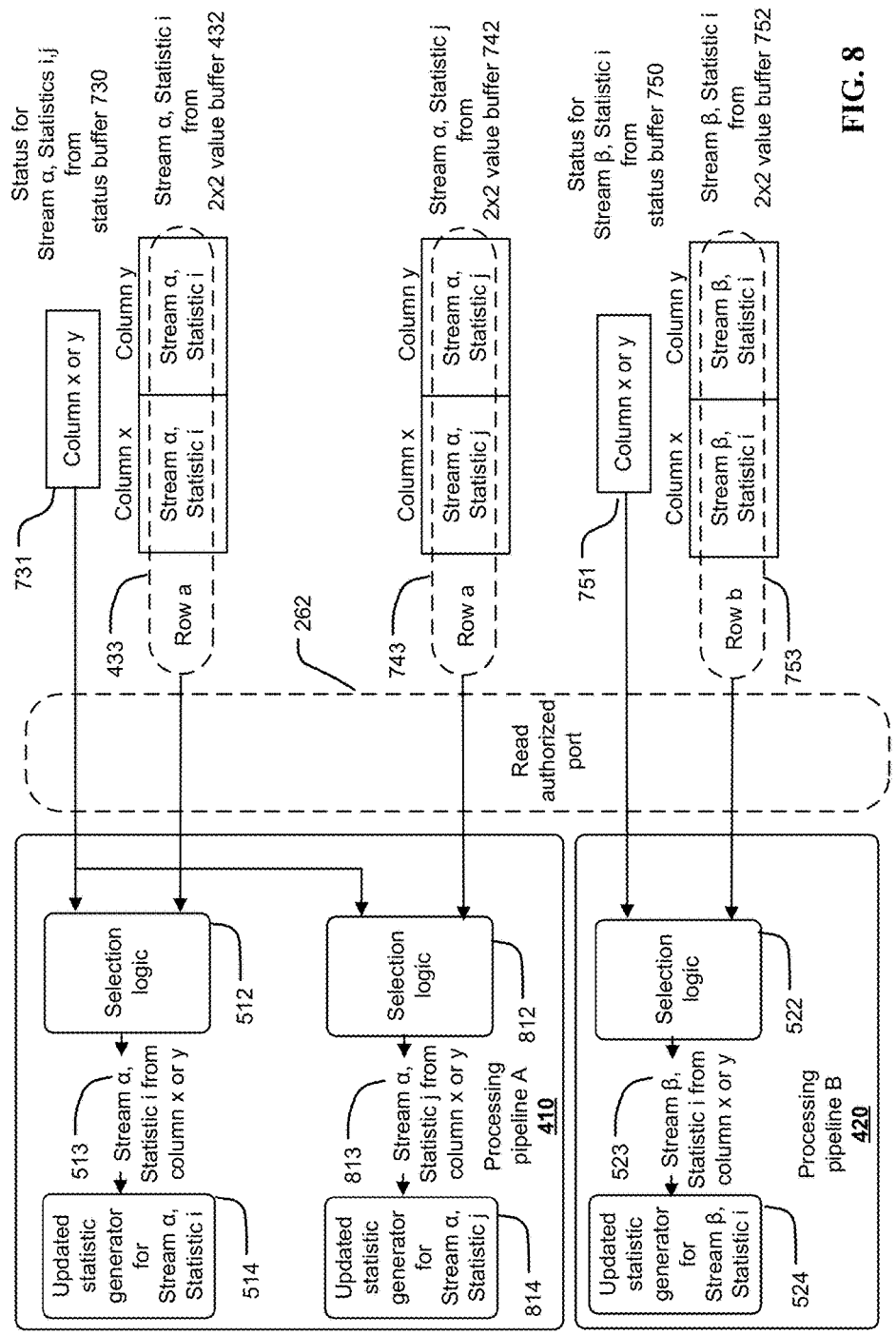
FIG. 8 illustrates 2 parallel processing pipelines that select most recently updated statistics out of rows of statistics that were read from 2×2 buffers, including multiple statistics for a same stream.

FIG. 8 illustrates 2 parallel processing pipelines that select most recently updated statistics out of rows of statistics that were read from 2×2 buffers, including multiple statistics for a same stream. In addition to the elements in FIG. 5, in FIG. 8 selection logic 812 in parallel pipeline A 410 uses the status 731 to select the most recently updated statistic j for stream α, which could be in Column x or y of Row a 743. This most recently updated statistic j for stream a 813 is shown as the output of selection logic 812. The updated statistic generator 814, in dependence on frame 1 411 of stream α, generates an updated version of the most recently updated statistic j for stream α 813.

Figure 9:
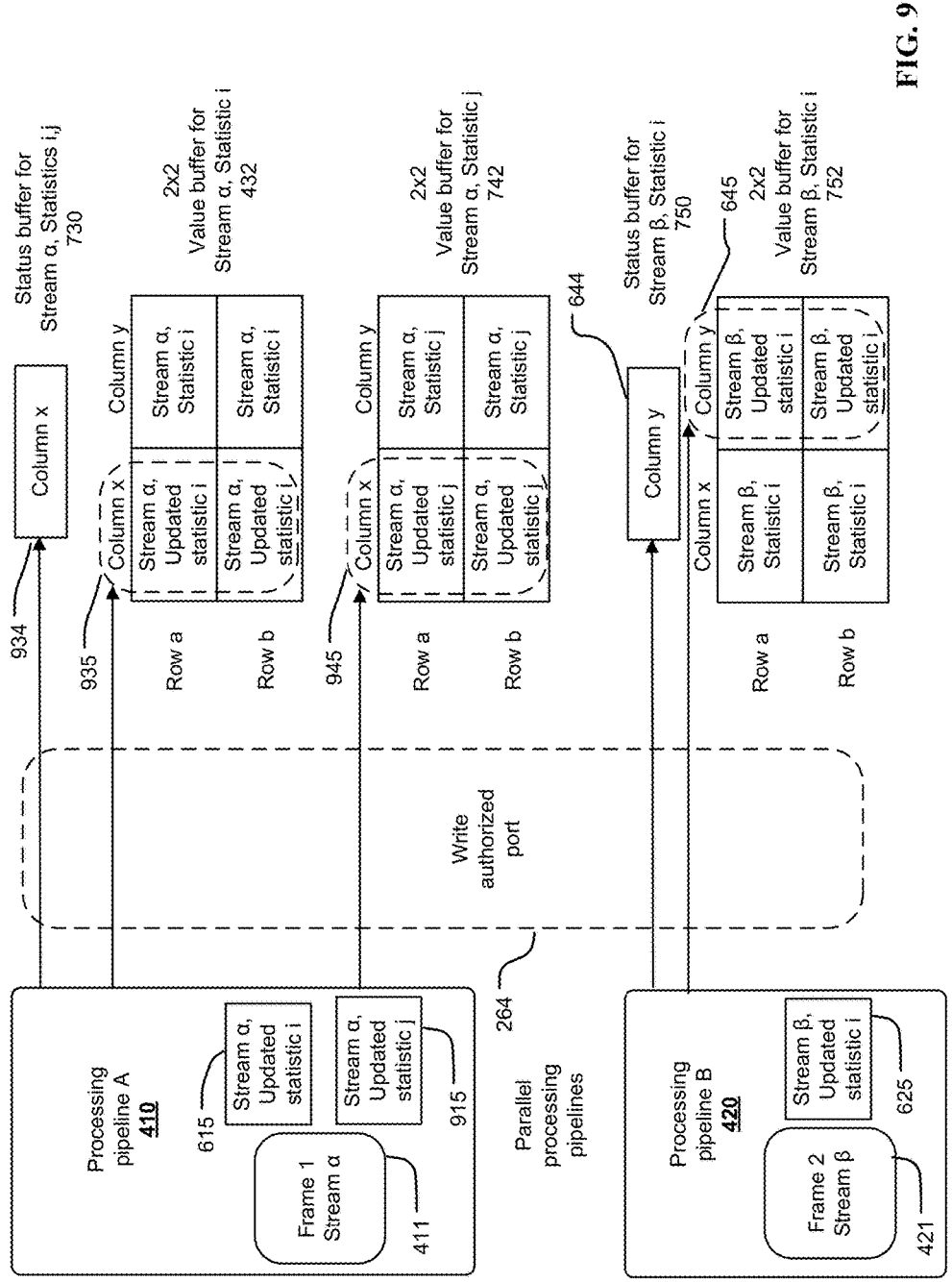
FIG. 9 illustrates 2 parallel processing pipelines that write columns of updated statistics to 2×2 buffers for 2 streams in parallel, including multiple statistics for a same stream.

FIG. 9 illustrates 2 parallel processing pipelines that write columns of updated statistics to 2×2 buffers for 2 streams in parallel, including multiple statistics for a same stream. In addition to the elements in FIG. 6, in FIG. 9 processing pipeline A 410 writes updated statistic j 915 into a portion of 2×2 value buffer 742 for stream α, statistic j, in particular Column x 945 spanning Rows a and b. The same statistic j is mirrored across Rows a and b of Column x 945, such that in a subsequent read from 2×2 value buffer 742, reading either Row a or b of Column x 945 will access the most recently updated statistic j of stream a stored in 2×2 value buffer 742.

Processing pipeline A 410 writes a value identifying Column x 934 into the status buffer 730. In a future read from the 2×2 value buffer 742 for stream α, statistic j, of Row a or b spanning Columns x and y, the following is performed. The particular processing pipeline, which is performing the future read from the 2×2 value buffer 742, also reads from the status buffer 730 and relies on the value identifying Column x 934 to select Column x of Row a or b as the most recently updated statistic j for stream α.

In the examples of FIGS. 7-9, two different statistics i and j are read, updated, and stored for stream α of frame 1 411. In other embodiments, 3 or more statistics (i, j, k, . . . ) are read, updated, and stored for stream α of frame 1 411. In the shown embodiment, one statistic i is read, updated, and stored for stream β of Frame 2 421. In other embodiments, 2 or more statistics are read, updated, and stored for stream β of Frame 2 421.

Also in the examples of FIGS. 7-9, the same Column x or y data from the same status buffer identified the most recently updated column in both Row a 433 spanning Columns x and y and Row a 743 spanning Columns x and y. In another embodiment, different status buffers store Column x or y data to identify the most recently updated column in Row a 433 and Row a 743—a first status buffer for Row a 433 and a second status buffer for Row a 743.

Figure 10:
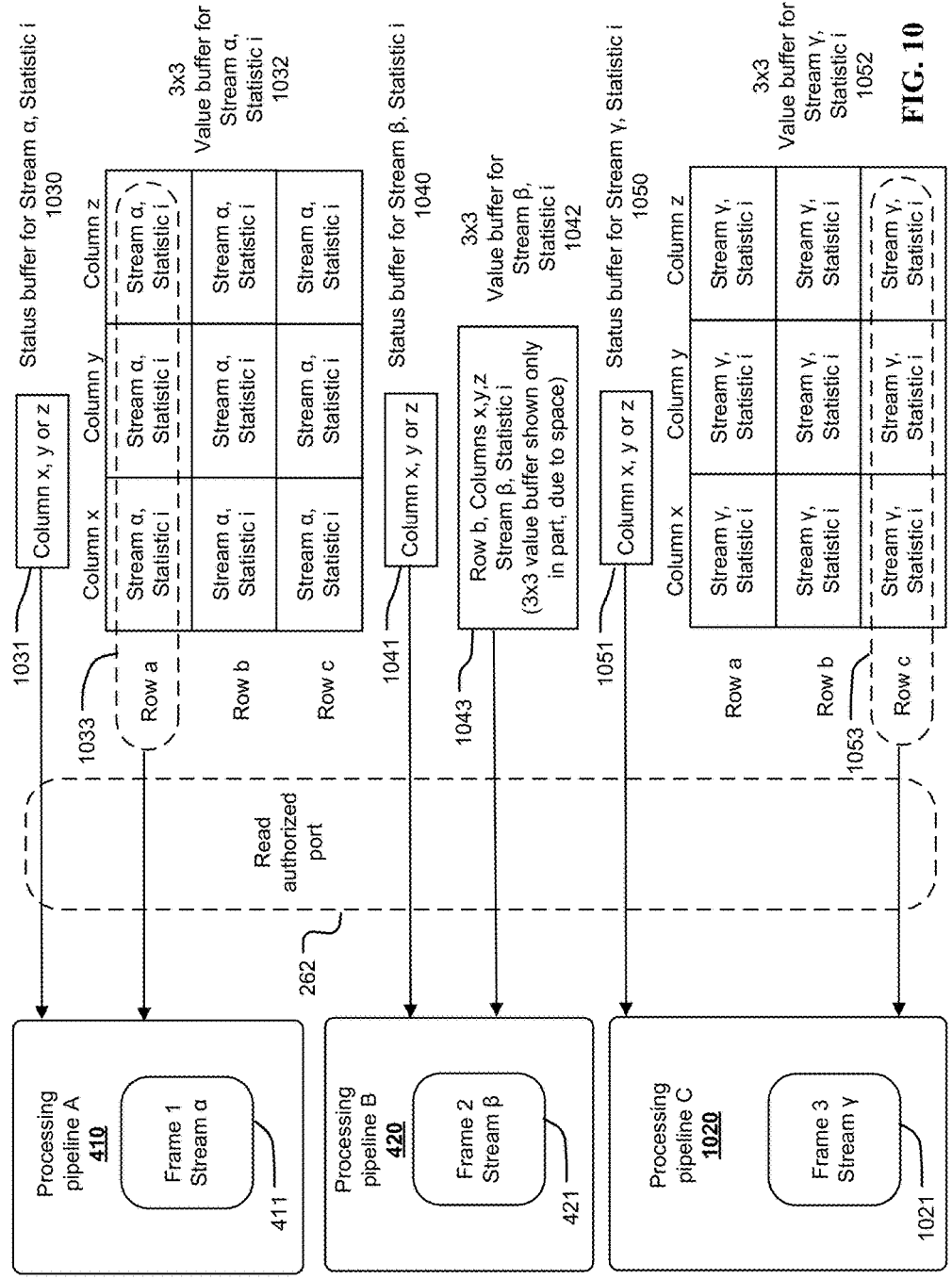
FIG. 10 illustrates 3 parallel processing pipelines that read rows of statistics from 3×3 buffers for 3 streams in parallel.

FIG. 10 illustrates 3 parallel processing pipelines that read rows of statistics from 3×3 buffers for 3 streams in parallel.

By contrast with FIG. 4 in which processing pipeline A 410 and processing pipeline B 420 read portions of respective 2×2 value buffers, in FIG. 10 processing pipeline A 410 reads a portion of the 3×3 value buffer 1032 for stream a, statistic i; and processing pipeline B 420 reads statistics from 3×3 value buffer 1042 for stream β, statistic i.

Also by contrast with FIG. 4 in which processing pipeline A 410 and processing pipeline B 420 read Column x or y data from respective status buffers, in FIG. 10 processing pipeline A 410 reads Column x, y, or z data from status buffer 1030 and from status buffer 1040. Column x, y, or z data identifies one of Columns x, y, and z as storing the most recently updated statistics in read rows of statistics.

In addition to the processing pipeline A 410 and processing pipeline B 420 in FIG. 4, FIG. 10 shows processing pipeline C 1020. Processing pipeline C 1020 processes frame 3 of stream γ 1021 and reads statistics from 3×3 value buffer 1052 for stream γ, statistic i via read authorized port 262. The 3×3 value buffer 1052 is shown as a 3×3 array with Columns x, y, and z and Rows a, b, and c.

Processing pipeline C 1020 reads a portion of the statistics from 3×3 value buffer 1052 for stream γ, statistic i, in particular Row c 1053 spanning Columns x, y, and z. Although Columns x, y, and z all store statistics, one of Columns x, y, and z stores most recently updated statistics i for stream γ, and the others of Columns x, y, and z store older statistics i for stream γ.

Processing pipeline C 1020 also reads data from the status buffer 1050 for stream γ, statistic i via read authorized port 262, where the data indicates Column x, y, or z 1051. The Column x, y, or z data 1051 from the status buffer 1050 identifies one of Columns x, y, and z as storing the most recently updated statistics i for stream γ.

Figure 11:
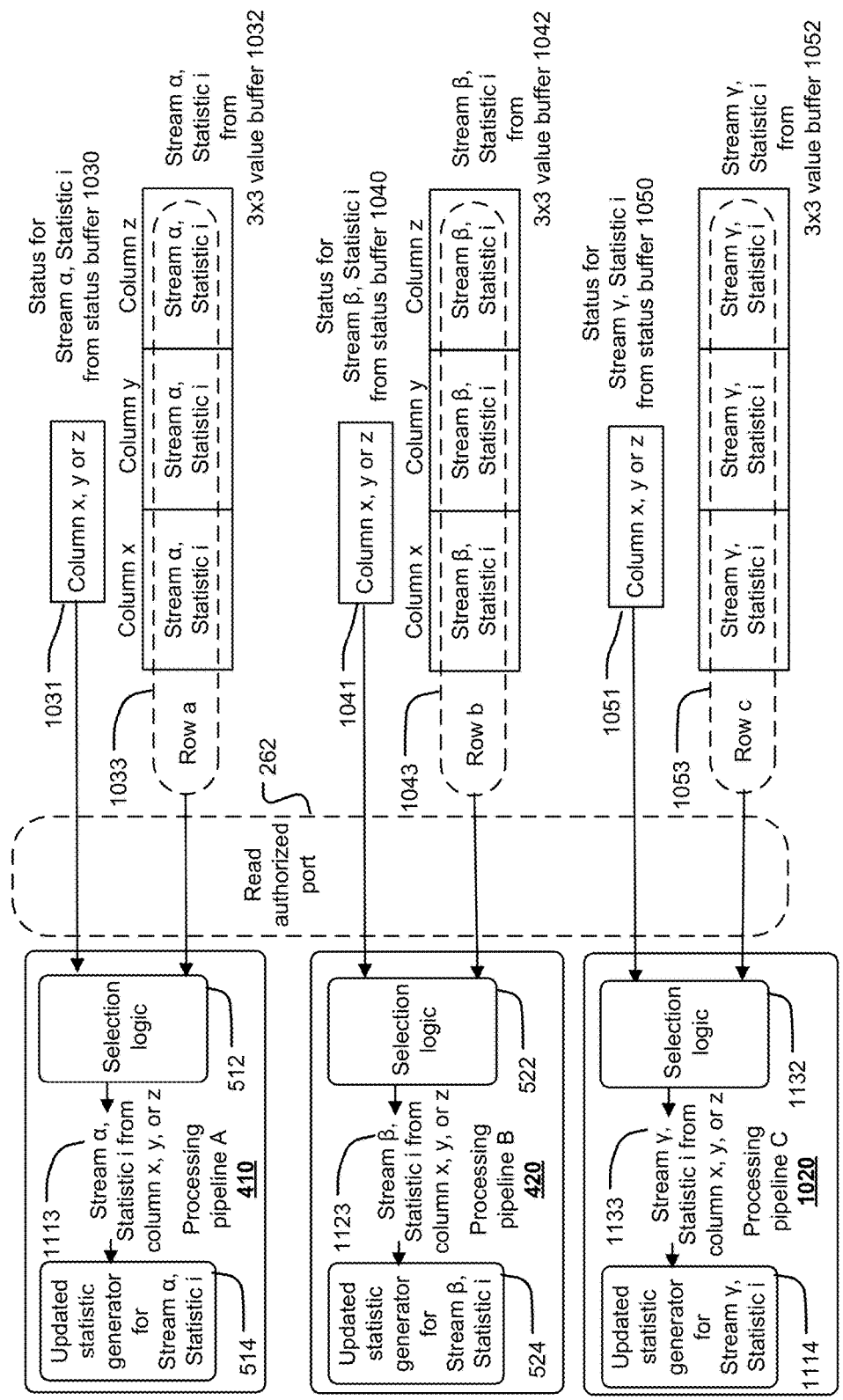
FIG. 11 illustrates 3 parallel processing pipelines that select most recently updated statistics out of rows of statistics that were read from 3×3 buffers.

FIG. 11 illustrates 3 parallel processing pipelines that select most recently updated statistics out of rows of statistics that were read from 3×3 buffers.

By contrast with FIG. 5 in which processing pipeline A 410 and processing pipeline B 420 each use selection logic to select the most recently updated statistic in Column x or y out of a row of statistics, in FIG. 11 processing pipeline A 410 and processing pipeline B 420 each use selection logic to select the most recently updated statistic in Column x, y, or z out of a row of statistics.

Processing pipeline A 410 reads Row a 1033 spanning Columns x, y, and z from 3×3 value buffer 1032 via read authorized port 262. Processing pipeline A 410 also reads status 1031 from status buffer for stream α, statistic i 1030 via read authorized port 262, where the status 1031 indicates Column x, y, or z. Selection logic 512 uses the status 1031 to select the most recently updated statistic i for stream α, which could be in Column x, y, or z of Row a 1033. This most recently updated statistic i for stream α 1113 is shown as the output of selection logic 512. The updated statistic generator 514, in dependence on frame 1 411 of stream α, generates an updated version of the most recently updated statistic i for stream α 1113.

Processing pipeline B 420 reads Row b 1043 spanning Columns x, y, and z from 3×3 value buffer 1042 via read authorized port 262. Processing pipeline B 420 also reads status 1041 from status buffer 1040 for stream β, statistic i via read authorized port 262, where the status 1041 indicates Column x, y, or z. Selection logic 522 uses the status 1041 to select the most recently updated statistic i for stream β, which could be in Column x, y, or z of Row b 1043. This most recently updated statistic i for stream β 1123 is shown as the output of selection logic 522. The updated statistic generator 524, in dependence on frame 2 421 of stream β, generates an updated version of the most recently updated statistic i for stream β 1123.

In addition to the processing pipeline A 410 and processing pipeline B 420 in FIG. 4, FIG. 11 shows processing pipeline C 1020. Processing pipeline C 1020 reads Row c 1053 spanning Columns x, y, and z from 3×3 value buffer 1052 via read authorized port 262. Processing pipeline C 1020 also reads status 1051 from status buffer 1050 for stream γ, statistic i via read authorized port 262, where the status 1051 indicates Column x, y, or z. Selection logic 1132 uses the status 1051 to select the most recently updated statistic i for stream γ, which could be in Column x, y, or z of Row c 1053. This most recently updated statistic i for stream γ 1133 is shown as the output of selection logic 1132. The updated statistic generator 1114, in dependence on frame 3 of stream γ 1021, generates an updated version of the most recently updated statistic i for stream γ 1133.

Figure 12:
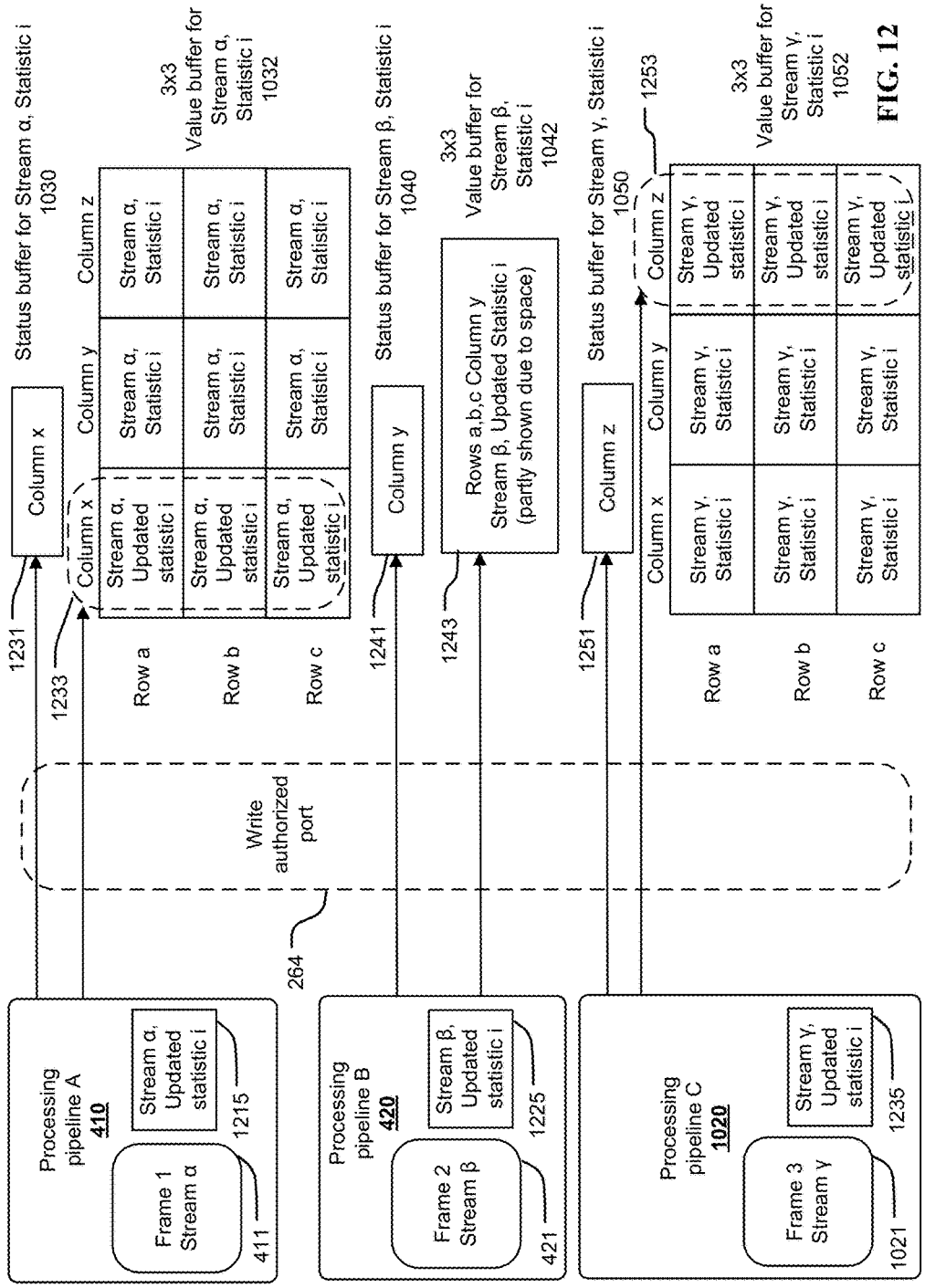
FIG. 12 illustrates 3 parallel processing pipelines that write columns of updated statistics to 3×3 buffers for 3 streams in parallel.

FIG. 12 illustrates 3 parallel processing pipelines that write columns of updated statistics to 3×3 buffers for 3 streams in parallel.

By contrast with FIG. 6 in which processing pipeline A 410 and processing pipeline B 420 each write updated statistics into portions of respective 2×2 value buffers, in FIG. 11 processing pipeline A 410 and processing pipeline B 420 each write updated statistics into portions of respective 3×3 value buffers. Processing pipeline A 410 writes updated statistic i 1215 into a portion of 3×3 value buffer 1032 for stream α, statistic i, in particular Column x 1233 spanning Rows a, b, and c. Processing pipeline A 410 also writes a value identifying Column x 1231 into the status buffer 1030. Processing pipeline B 420 writes updated statistic i 1225 into a portion of 3×3 value buffer 1042 for stream β, statistic i, in particular Column y 1243 spanning Rows a, b, and c. Processing pipeline B 420 also writes a value identifying Column y 1241 into the status buffer 1040.

In addition to the processing pipeline A 410 and processing pipeline B 420 in FIG. 6, FIG. 12 shows processing pipeline C 1020. In processing pipeline C 1020, updated statistic i 1235 for stream γ was generated by updated statistic generator 1114 of FIG. 11. Processing pipeline C 1020 writes updated statistic i 1235 into a portion of 3×3 value buffer 1052 for stream γ, statistic i, in particular Column z 1253 spanning Rows a, b, and c. The same statistic i is mirrored across Rows a, b, and c of Column z 1253, such that in a subsequent read from 3×3 value buffer 1052, reading any of Row a, b, or c of Column z 1253 will access the most recently updated statistic i of stream a stored in 3×3 value buffer 1032.

Processing pipeline C 1020 also writes a value identifying Column z 1251 into the status buffer 1050. Then, in a future read from the 3×3 value buffer 1052 for stream y, statistic i, of Row a, b, or c each spanning Columns x, y, and z, the following is performed. The particular processing pipeline, which is performing the future read from the 3×3 value buffer 1052, also reads from the status buffer 1050 and relies on the value identifying Column z 1251 read from the status buffer 1050 to select Column z of Row a, b, or c as the most recently updated statistic i for stream γ.

In the examples of FIGS. 10-12, three processing pipelines process three different frames of three different streams in parallel. The statistics are read from 3×3 arrays with 3 Columns and 3 Rows, updated, and written back to the 3×3 arrays. In other embodiments, n processing pipelines process n different frames of n different streams in parallel. The statistics are read from n×n arrays with n Columns and n Rows, updated, and written back to the n×n arrays.

FIGS. 13-16 show examples of the operation of parallel stream test and merge logic 240 of FIG. 2.

Figure 13:
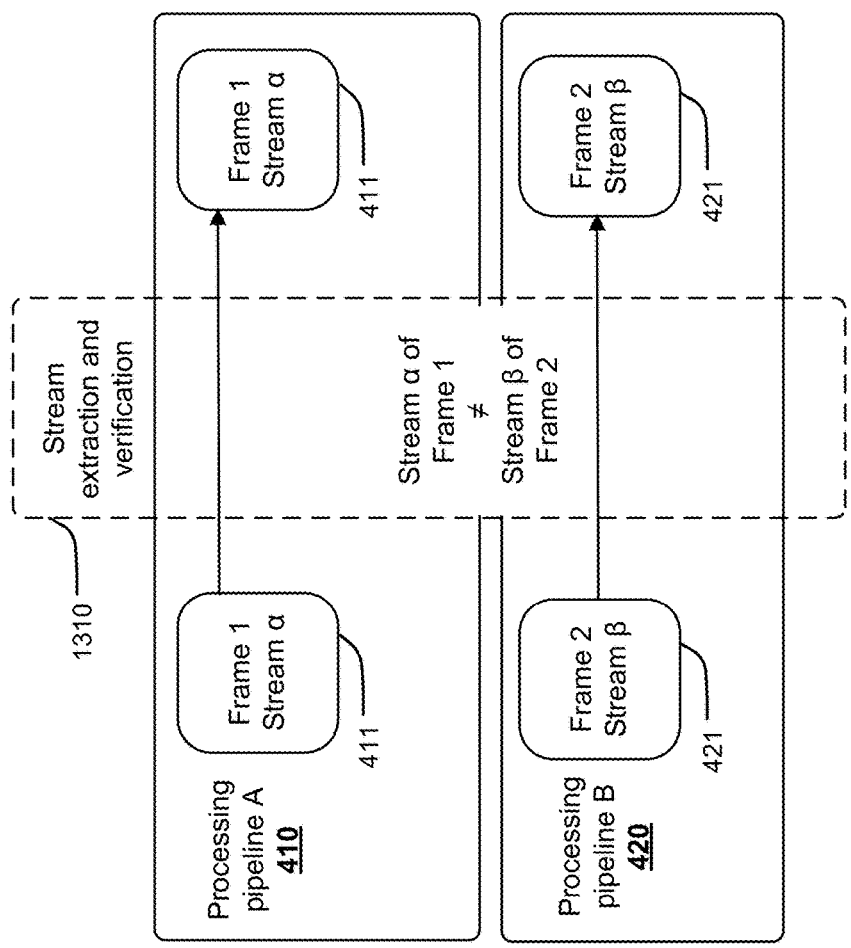
FIG. 13 illustrates 2 parallel processing pipelines for which 2 frames for streams that are different are not merged.

FIG. 13 illustrates 2 parallel processing pipelines for which 2 frames for streams that are different are not merged.

In parallel, processing pipeline A 410 processes frame 1 411 of stream α and processing pipeline B 420 processes frame 2 421 of stream β. Stream extraction and verification 1310 extracts stream data from the frames—stream α from frame 1 411 and stream β from frame 2 421. Stream extraction and verification 1310 verifies that stream α and stream β extracted from different frames are different streams, such that stream α≠stream β. Then processing pipeline A 410 continues to process frame 1 411 and processing pipeline B 420 continues to process frame 2 as discussed in connection with FIGS. 4-9.

Figure 14:
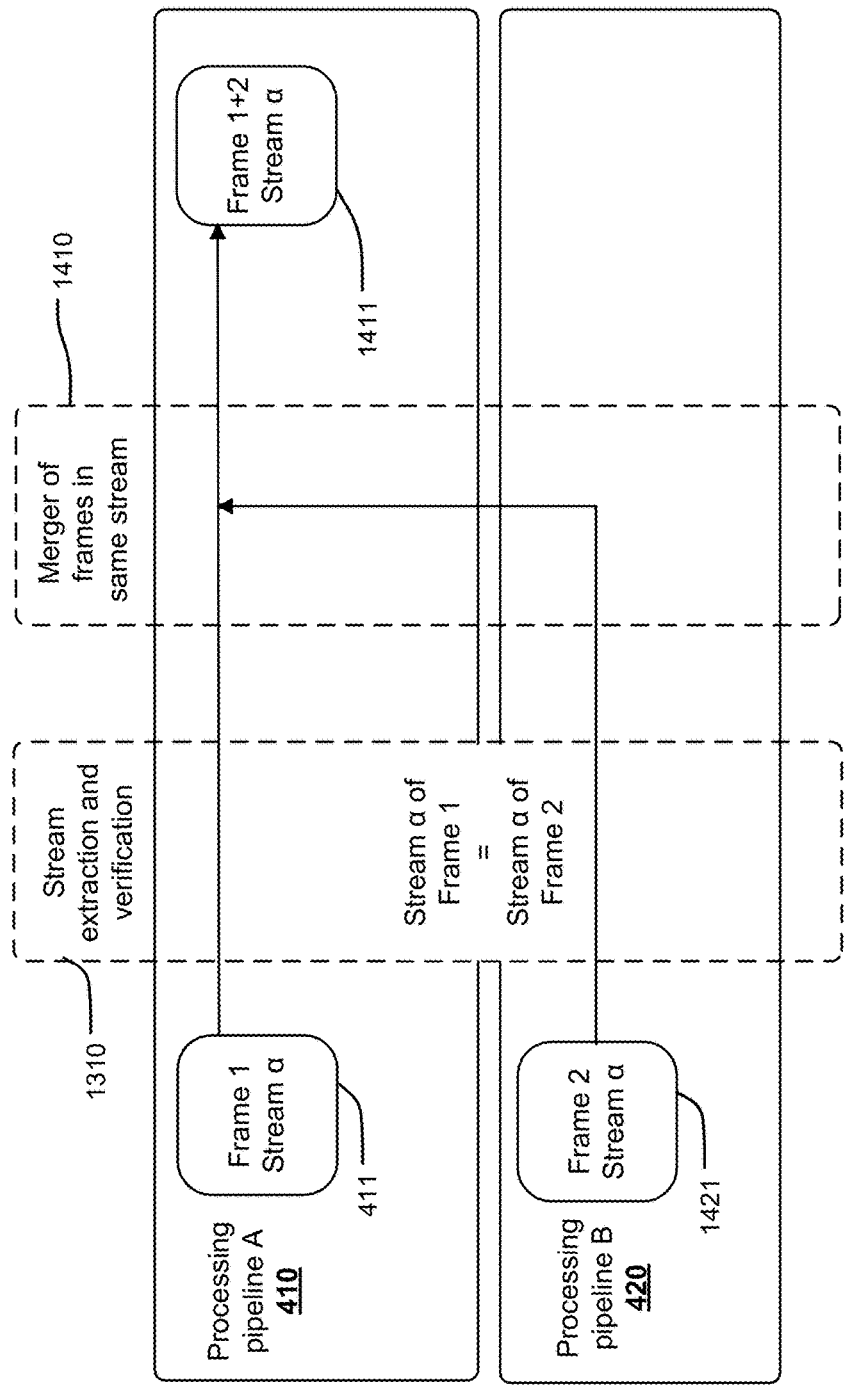
FIG. 14 illustrates 2 parallel processing pipelines for which 2 frames for streams that are the same are merged.

FIG. 14 illustrates 2 parallel processing pipelines for which 2 frames for streams that are the same are merged. Stream extraction and verification 1310 extracts stream data from frames in parallel—stream α from frame 1 411 and stream α from frame 2 1421. By contrast with FIG. 13, in FIG. 14 stream extraction and verification 1310 fails to verify that stream α and stream α extracted from different frames are different streams. Merger of frames in same stream 1410 merges frame 1 411 and frame 2 1421, resulting in merged frame 1+2 1411 of stream α. Then processing pipeline A 410 continues to process frame 1 411 and processing pipeline B 420 continues to process frame 2 as discussed in connection with FIGS. 4-9, with the exception that processing pipeline B 420 is less busy due to the absence of frame 2 1421.

Figure 15:
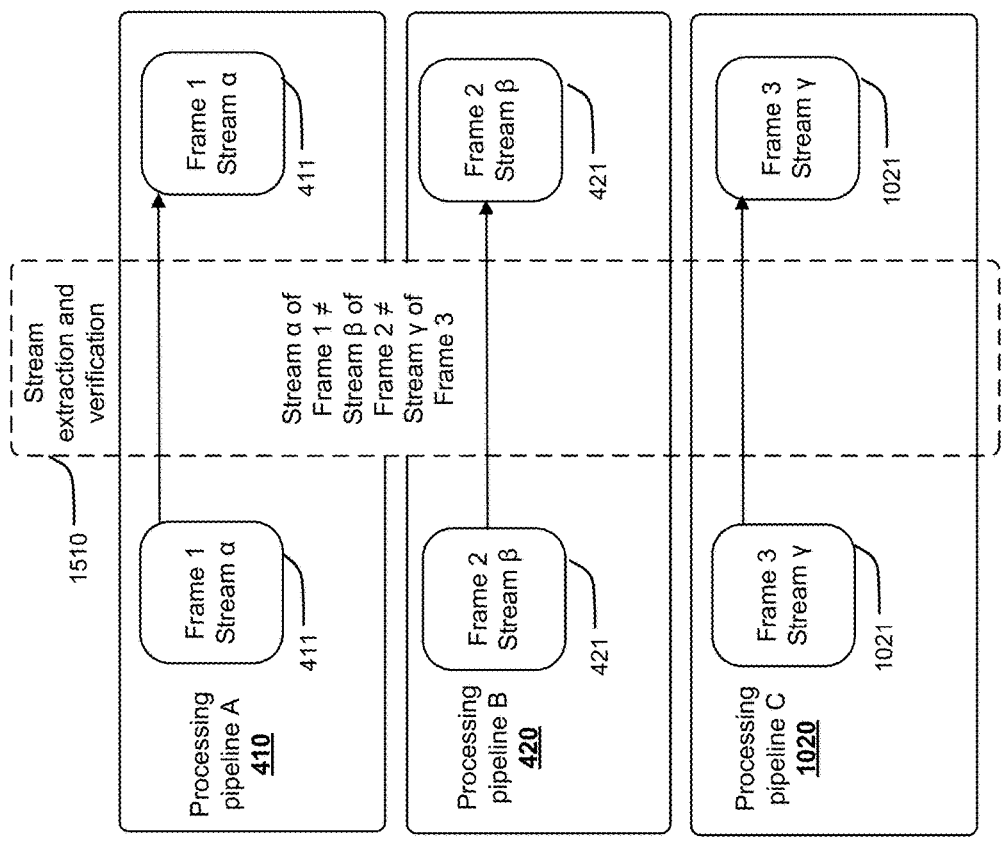
FIG. 15 illustrates 3 parallel processing pipelines for which, out of 3 frames for streams that are different, no frames are merged.

FIG. 15 illustrates 3 parallel processing pipelines for which, out of 3 frames for streams that are different, no frames are merged. In addition to processing pipeline A 410 which processes frame 1 411 of stream α and processing pipeline B 420 which processes frame 2 421 of stream β, in FIG. 15 processing pipeline C 1020 processes frame 3 of stream γ 1021. Stream extraction and verification 1310 verifies that stream α, stream β, and stream γ—all extracted from different frames—are different streams. Each of the streams extracted from a different frame is different from the other streams extracted from the other frames (i.e. stream α≠stream β, stream α≠stream γ, stream β≠stream γ).

Figure 16:
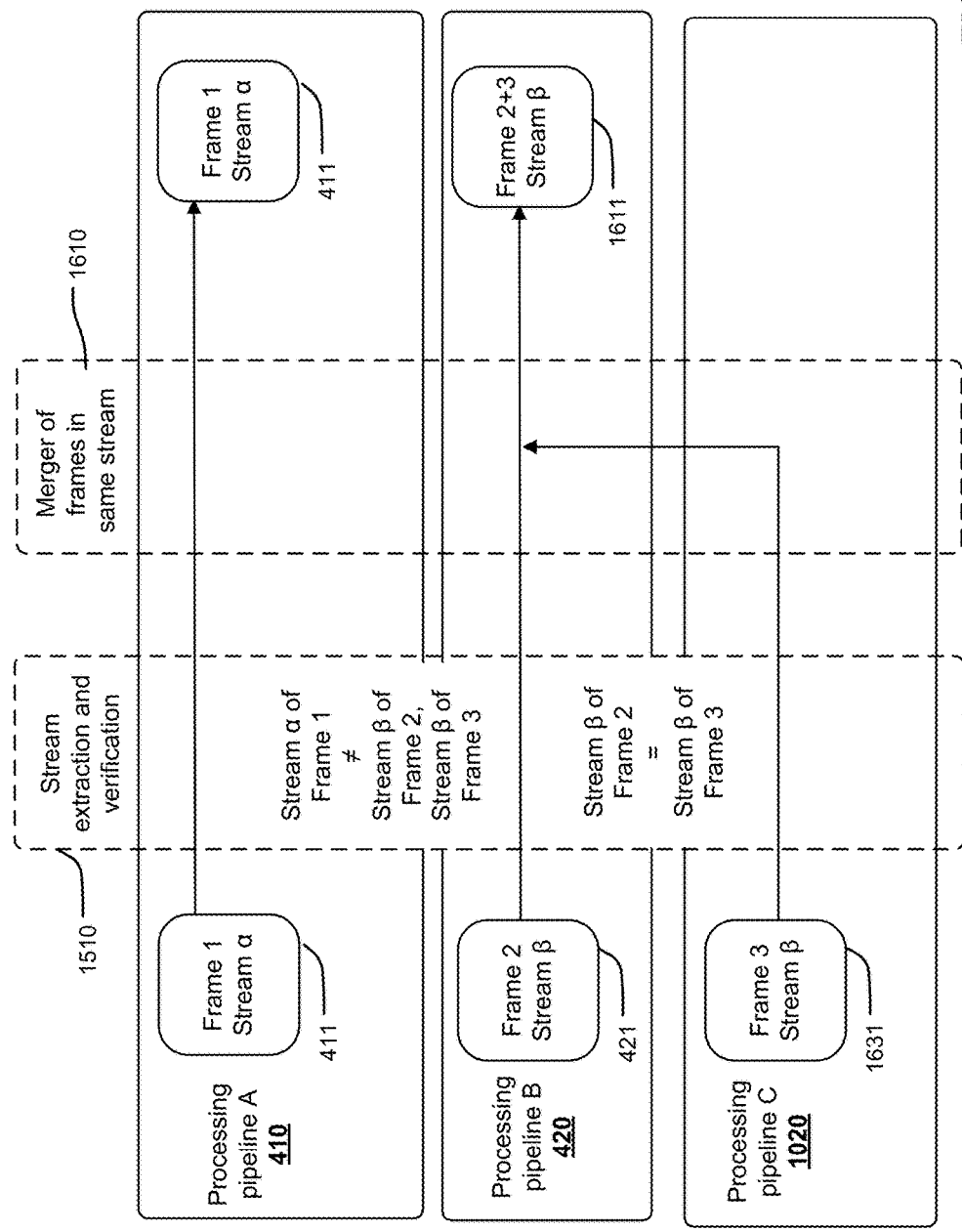
FIG. 16 illustrates 3 parallel processing pipelines for which, out of 3 frames, 2 frames for streams that are the same are merged.

FIG. 16 illustrates 3 parallel processing pipelines for which, out of 3 frames, 2 frames for streams that are the same are merged. Stream extraction and verification 1510 extracts stream data from frames in parallel—stream α from frame 1 411, stream α from frame 2 421, and stream β from frame 3 1631. By contrast with FIG. 15, in FIG. 16 stream extraction and verification 1610 fails to verify that each of the streams extracted from a different frame is different from the other streams extracted from the other frames. Although stream a extracted from frame 1 411 is different from both stream β extracted from frame 2 421 and stream β extracted from frame 3, stream β extracted from frame 2 421 is not different from stream β extracted from frame 3. Merger of frames in same stream 1610 merges frame 2 421 and frame 3 1631, resulting in merged frame 2+3 of stream β 1611.

In another example, all frames including frame 1 411, frame 2 421, and frame 3 1631 are from the same stream. Then merger of frames in same stream 1610 merges frame 1 411, frame 2 421, and frame 3 1631 into frame 1+2+3 for any one of processing pipeline A 410, processing pipeline B 420, and processing pipeline C 1020. Then frame processing continues as discussed in connection with FIGS. 10-12, with the exception that two of the processing pipelines are less busy than the processing pipeline with the combined frame 1+2+3 due to the absence of two of the frames.

Particular Implementations

In one implementation, a disclosed method processes a data feed including multiple streams. The method includes processing n frames of the multiple streams in parallel through n processing pipelines, n being an integer greater than or equal to 2. The n frames include a first frame belonging to a first stream and a second frame belonging to a second stream. The first stream is different than the second stream. The n processing pipelines are coupled to n-by-n value buffers per stream per recorded value for the stream, and at least one status buffer per stream. The n processing pipelines are each assigned a distinct row of read-authorized port access to the n-by-n value buffers and a distinct column of write-authorized port access to the n-by-n value buffers.

In the first processing pipeline, the method includes reading, for the first stream, a first row of the n-by-n value buffers using the read-authorized port to the value buffers in the first row; reading a first status buffer to determine which of the value buffers in the first row contains a most recently updated value and processing the most recently updated value to produce a currently updated value; and writing the currently updated value to a first column of the n-by-n value buffers using the write-authorized port, while writing to the first status buffer to indicate that the first column of the value buffers has been updated with the most recently updated value, more recently than the second column of the value buffers.

This method and other implementations of the technology disclosed can include one or more of the following features and/or features described in connection with additional methods disclosed. In the interest of conciseness, the combinations of features disclosed in this application are not individually enumerated and are not repeated with each base set of features. The reader will understand how features identified in this section can readily be combined with sets of base features identified as implementations.

For some implementations, in the second processing pipeline, the method includes reading, for the second stream, a second row of the n-by-n value buffers using the read-authorized port to the value buffers in the row; reading a second status buffer to determine which of the value buffers in the second row contains a most recently updated value and processing the most recently updated value to produce a currently updated value; and writing the currently updated value to a second column of the n-by-n value buffers using the write-authorized port, while writing to the status buffer to indicate that the second column of the value buffers has been updated with the most recently updated value.

For some implementations, the method further comprises, repeatedly applying the method to at least hundreds of millions of frames per second from at least thousands of streams, each stream having one or more n-by-n value buffers and one or more status buffers.

For some implementations, the method further comprises, identifying streams to which the n frames belong, and checking that all of the streams are different.

For some implementations, the method further comprises, identifying streams to which the n frames belong, and responsive to at least two of the streams being a same stream, merging the frames belonging to the same stream into a single frame.

In some implementations, the recorded value is an order-based statistic for the first stream and at least two sets of n-by-n value buffers contain a most recent frame sequence value used to determine the order-based statistic and an order-based statistic counter used to store results of an order-based comparison.

In some implementations, the n processing pipelines have a combined throughput of at least n frames per clock cycle of a clock for the n-by-n value buffers and the at least one status buffer.

In some implementations, the n-by-n value buffers are accessible via both the read-authorized port access and the write-authorized port access at a same time.

For some implementations, the method further comprises, responsive to writing the currently updated value to rows of the first column of the n-by-n value buffers using the write-authorized port, the currently updated value is mirrored across the rows of the first column of the n-by-n value buffers.

For some implementations, the method further comprises, prior to the processing the n frames, generating the n frames of test traffic.

For some implementations, the method further comprises, prior to the processing the n frames, receiving the n frames of test traffic.

Other implementations may include non-transitory tangible computer readable media impressed with instructions that, when executed on a computer device, perform any of the processes described above.

Yet another implementation may include a computing system comprising one or more processors and memory, coupled to the processors, containing computer instructions that, when executed on the processors, cause the computing system to perform any of the processes described above.

While the technology disclosed is disclosed by reference to the preferred embodiments and examples detailed above, it is to be understood that these examples are intended in an illustrative rather than in a limiting sense. It is contemplated that modifications and combinations will readily occur to those skilled in the art, which modifications and combinations will be within the spirit of the invention and the scope of the following claims.

It is contemplated that modifications and combinations will readily occur to those skilled in the art, which modifications and combinations will be within the spirit of the technology and the scope of the following claims.

We claim as follows:

1. A method of processing a data feed including multiple streams, comprising:
    processing n frames of the multiple streams in parallel through n processing pipelines, n being an integer greater than or equal to 2, the n frames including a first frame belonging to a first stream and a second frame belonging to a second stream, wherein the first stream is different than the second stream, the n processing pipelines being coupled to:
       n-by-n value buffers per stream per recorded value for the stream; and
       at least one status buffer per stream;
       wherein the n processing pipelines are each assigned a distinct row of read-authorized port access to the n-by-n value buffers and a distinct column of write-authorized port access to the n-by-n value buffers; and
    in a first processing pipeline:
       reading, for the first stream, a first row of the n-by-n value buffers using the read-authorized port to the value buffers in the first row;
       reading a first status buffer to determine which of the value buffers in the first row contains a most recently updated value and processing the most recently updated value to produce a currently updated value; and
       writing the currently updated value to a first column of the n-by-n value buffers using the write-authorized port, while writing to the first status buffer to indicate that the first column of the value buffers has been updated with the most recently updated value, more recently than a second column of the value buffers.

2. The method of claim 1, wherein in a second processing pipeline:
    reading, for the second stream, a second row of the n-by-n value buffers using the read-authorized port to the value buffers in the row;
    reading a second status buffer to determine which of the value buffers in the second row contains a most recently updated value and processing the most recently updated value to produce a currently updated value; and
    writing the currently updated value to a second column of the n-by-n value buffers using the write-authorized port, while writing to the status buffer to indicate that the second column of the value buffers has been updated with the most recently updated value.

3. The method of claim 1, further comprising:
    repeatedly applying the method of claim 1 to at least hundreds of millions of frames per second from at least thousands of streams, each stream having one or more n-by-n value buffers and one or more status buffers.

4. The method of claim 2, further comprising:
    repeatedly applying the method of claim 2 to at least hundreds of millions of frames per second from at least thousands of streams, each stream having one or more n-by-n value buffers and one or more status buffers.

5. The method of claim 1, further comprising:
    identifying streams to which the n frames belong, and checking that all of the streams are different.

6. The method of claim 1, further comprising:
    identifying streams to which the n frames belong, and responsive to at least two of the streams being a same stream, merging the frames belonging to the same stream into a single frame.

7. The method of claim 1, wherein
    the recorded value is an order-based statistic for the first stream and at least two sets of n-by-n value buffers contain a most recent frame sequence value used to determine the order-based statistic and an order-based statistic counter used to store results of an order-based comparison.

8. The method of claim 1, wherein
    the n processing pipelines have a combined throughput of at least two frames per clock cycle of a clock for the n-by-n value buffers and the at least one status buffer.

9. The method of claim 1, wherein
    responsive to writing the currently updated value to rows of the first column of the n-by-n value buffers using the write-authorized port, the currently updated value is mirrored across the rows of the first column of the n-by-n value buffers.

10. The method of claim 1, further comprising:
    prior to the processing the n frames, generating the n frames of test traffic.

11. The method of claim 1, further comprising:
    prior to the processing the n frames, receiving the n frames of test traffic.

12. A computing device that processes a data feed including multiple streams, the computing device including a field-programmable gate array (FPGA), the FPGA configured to perform operations comprising:
processing n frames of the multiple streams in parallel through n processing pipelines, n being an integer greater than or equal to 2, the n frames including a first frame belonging to a first stream and a second frame belonging to a second stream, wherein the first stream is different than the second stream, the n processing pipelines being coupled to:
n-by-n value buffers per stream per recorded value for the stream; and
at least one status buffer per stream;
wherein the n processing pipelines are each assigned a distinct row of read-authorized port access to the n-by-n value buffers and a distinct column of write-authorized port access to the n-by-n value buffers; and
in a first processing pipeline:
reading, for the first stream, a first row of the n-by-n value buffers using the read-authorized port to the value buffers in the row;
reading a first status buffer to determine which of the value buffers in the first row contains a most recently updated value and processing the most recently updated value to produce a currently updated value; and
writing the currently updated value to a first column of the n-by-n value buffers using the write-authorized port, while writing to the first status buffer to indicate that the first column of the value buffers has been updated with the most recently updated value.

13. The computing device of claim 12, wherein the FPGA is configured to perform the operations further comprising:
in a second processing pipeline:
reading, for the second stream, a second row of the n-by-n value buffers using the read-authorized port to the value buffers in the row;
reading a second status buffer to determine which of the value buffers in the second row contains a most recently updated value and processing the most recently updated value to produce a currently updated value; and
writing the currently updated value to a second column of the n-by-n value buffers using the write-authorized port, while writing to the status buffer to indicate that the second column of the value buffers has been updated with the most recently updated value.

14. The computing device of claim 12, wherein the FPGA is configured to perform the operations further comprising:
repeatedly applying the operations of claim 12 to at least hundreds of millions of frames per second from at least thousands of streams, each stream having one or more n-by-n value buffers and one or more status buffers.

15. The computing device of claim 13, wherein the FPGA is configured to perform the operations further comprising:
repeatedly applying the operations of claim 13 to at least hundreds of millions of frames per second from at least thousands of streams, each stream having one or more n-by-n value buffers and one or more status buffers.

16. The computing device of claim 12, wherein the FPGA is configured to perform the operations further comprising:
identifying streams to which the n frames belong, and checking that all of the streams are different.

17. The computing device of claim 12, wherein the FPGA is configured to perform the operations further comprising:
identifying streams to which the n frames belong, and responsive to at least two of the streams being a same stream, merging the frames belonging to the same stream into a single frame.

18. The computing device of claim 12, wherein the FPGA is configured such that:
the recorded value is an order-based statistic for the first stream and at least two sets of n-by-n value buffers contain a most recent frame sequence value used to determine the order-based statistic and an order-based statistic counter used to store results of an order-based comparison.

19. The computing device of claim 12, wherein the FPGA is configured such that:
the n processing pipelines have a combined throughput of at least two frames per clock cycle of a clock for the n-by-n value buffers and the at least one status buffer.

20. The computing device of claim 12, wherein the FPGA is configured such that:
responsive to writing the currently updated value to rows of the first column of the n-by-n value buffers using the write-authorized port, the currently updated value is mirrored across the rows of the first column of the n-by-n value buffers.

21. The computing device of claim 12, wherein the FPGA is configured the operations further comprising:
prior to the processing the n frames, generating the n frames of test traffic.

22. The computing device of claim 12, wherein the FPGA is configured the operations further comprising:
prior to the processing the n frames, receiving the n frames of test traffic.

23. A nontransitory computer readable medium storing a field-programmable gate array (FPGA) configuration that processes a data feed including multiple streams, which when loaded into an FPGA configures the FPGA to perform operations comprising:
processing n frames of the multiple streams in parallel through n processing pipelines, n being an integer greater than or equal to 2, the n frames including a first frame belonging to a first stream and a second frame belonging to a second stream, wherein the first stream is different than the second stream, the n processing pipelines being coupled to:
n-by-n value buffers per stream per recorded value for the stream; and
at least one status buffer per stream;
wherein the n processing pipelines are each assigned a distinct row of read-authorized port access to the n-by-n value buffers and a distinct column of write-authorized port access to the n-by-n value buffers; and
in a first processing pipeline:
reading, for the first stream, a first row of the n-by-n value buffers using the read-authorized port to the value buffers in the row;
reading a first status buffer to determine which of the value buffers in the first row contains a most recently updated value and processing the most recently updated value to produce a currently updated value; and
writing the currently updated value to a first column of the n-by-n value buffers using the write-authorized port, while writing to the first status buffer to indicate that the first column of the value buffers has been updated with the most recently updated value.

24. The nontransitory computer readable medium of claim 23, wherein the FPGA configuration configures the FPGA to perform the operations further comprising:
in a second processing pipeline:
reading, for the second stream, a second row of the n-by-n value buffers using the read-authorized port to the value buffers in the row;
reading a second status buffer to determine which of the value buffers in the second row contains a most recently updated value and processing the most recently updated value to produce a currently updated value; and
writing the currently updated value to a second column of the n-by-n value buffers using the write-authorized port, while writing to the status buffer to indicate that the second column of the value buffers has been updated with the most recently updated value.

25. The nontransitory computer readable medium of claim 23, wherein the FPGA configuration configures the FPGA to perform the operations further comprising:
repeatedly applying the operations of claim 23 to at least hundreds of millions of frames per second from at least thousands of streams, each stream having one or more n-by-n value buffers and one or more status buffers.

26. The nontransitory computer readable medium of claim 24, wherein the FPGA configuration configures the FPGA further comprising:
repeatedly applying the operations of claim 24 to at least hundreds of millions of frames per second from at least thousands of streams, each stream having one or more n-by-n value buffers and one or more status buffers.

27. The nontransitory computer readable medium of claim 23, wherein the FPGA configuration configures the FPGA to perform the operations further comprising:
identifying streams to which the n frames belong, and checking that all of the streams are different.

28. The nontransitory computer readable medium of claim 23, wherein the FPGA configuration configures the FPGA to perform the operations further comprising:
identifying streams to which the n frames belong, and responsive to at least two of the streams being a same stream, merging the frames belonging to the same stream into a single frame.

29. The nontransitory computer readable medium of claim 23, wherein the FPGA configuration configures the FPGA such that:
the recorded value is an order-based statistic for the first stream and at least two sets of n-by-n value buffers contain a most recent frame sequence value used to determine the order-based statistic and an order-based statistic counter used to store results of an order-based comparison.

30. The nontransitory computer readable medium of claim 23, wherein the FPGA configuration configures the FPGA such that:
the n processing pipelines have a combined throughput of n frames per clock cycle of a clock for the n-by-n value buffers and the at least one status buffer.

31. The nontransitory computer readable medium of claim 23, wherein the FPGA configuration configures the FPGA such that:
responsive to writing the currently updated value to rows of the first column of the n-by-n value buffers using the write-authorized port, the currently updated value is mirrored across the rows of the first column of the n-by-n value buffers.

32. The nontransitory computer readable medium of claim 23, wherein the FPGA configuration configures the FPGA such that:
prior to the processing the n frames, generating the n frames of test traffic.

33. The nontransitory computer readable medium of claim 23, wherein the FPGA configuration configures the FPGA such that:
prior to the processing the n frames, receiving the n frames of test traffic.

\* \* \* \* \*